United States Patent [19]

Goebel

[11] Patent Number: 4,517,736

[45] Date of Patent: May 21, 1985

[54] METHOD OF FABRICATION OF AN ELECTROCHEMICAL CELL

[75] Inventor: Franz Goebel, Sudbury, Mass.

[73] Assignee: GTE Communications Products Corp., Stamford, Conn.

[21] Appl. No.: 591,745

[22] Filed: Mar. 21, 1984

[51] Int. Cl.³ ............................................. H01M 2/12
[52] U.S. Cl. ................................................... 29/623.2
[58] Field of Search ............................ 29/623.1–623.5, 29/730; 429/194, 196, 110, 113, 116

[56] References Cited

U.S. PATENT DOCUMENTS

| 4,035,909 | 7/1977 | Dey ..................................... | 29/623.2 |
| 4,376,811 | 3/1983 | Goebel ................................ | 429/101 |
| 4,391,036 | 7/1983 | Kishimoto et al. ................. | 29/623.2 |

Primary Examiner—Charles F. LeFevour
Attorney, Agent, or Firm—J. Stephen Yeo

[57] ABSTRACT

In one aspect of the invention, an electrochemical reserve cell is assembled by arranging within a cylindrical housing a concentric arrangement of a container, a lithium sheet, a porous separator, and a porous carbon element. The container holds a quantity of electrolyte solute which may be either a salt or dissolved in a solvent. A quantity of liquid cathode solvent is inserted in the housing but outside the centrally located container. Electrical contact is made between the lithium sheet and a cap terminal and the housing is sealed completing the assembly.

To activate the cell, the container is broken, allowing its contents to mix with the solvent.

8 Claims, 1 Drawing Figure

U.S. Patent May 21, 1985 4,517,736
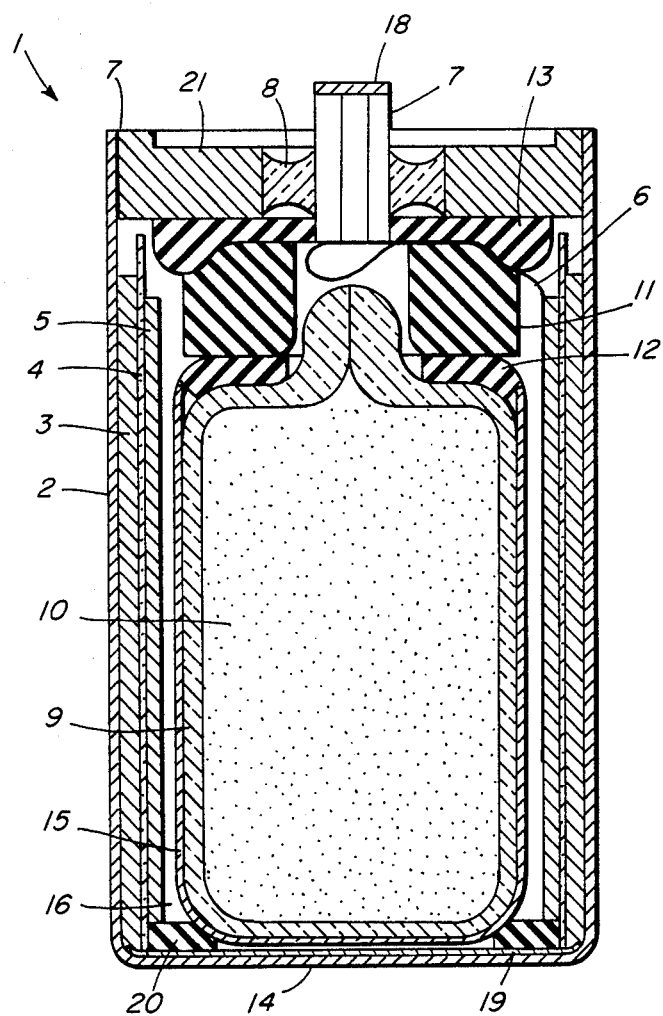

METHOD OF FABRICATION OF AN ELECTROCHEMICAL CELL

RELATED APPLICATIONS

A related patent application Ser. No. 591,720 filed 3/21/84 titled "Liquid Cathode Reserve Cell" was filed concurrently with the present application in the name of Franz Goebel and assigned to the same assignee.

BACKGROUND OF THE INVENTION

This invention pertains to methods of assembling electrochemical cells and more particularly is concerned methods of assembling with liquid cathode reserve cells.

Primary electrochemical cells are utilized for a wide variety of applications and are commonly available in a large assortment of sizes and shapes, including the familiar cylindrical cell. A cylindrical cell is disclosed in U.S. Pat. No. 4,376,811 in the name of Franz Goebel and assigned to GTE Laboratories Incorporated. The cylindrical cell as disclosed in the Goebel patent includes a lithium anode, a carbon cathode current collector structure, and a porous separator interposed between the lithium anode and the carbon cathode current collector structure.

The carbon cathode current collector structure is physically pressed against the interior wall of a metal housing and is arranged concentrically within the housing with the separator and lithium anode. The assembly of the lithium anode, carbon cathode current collector structure and separator is exposed to an electrolytic solution including a reducible liquid cathode solvent and an electrolyte solute dissolved in the reducible cathode solvent. Suitable materials for the reducible cathode solvent and the electrolyte solute are thionyl chloride and lithium tetrachloraluminate, respectively.

In the normal discharge of such a cell, the reducible cathode solvent is catalytically reduced at the surface of the carbon cathode current collector structure. This catalytic reduction results in the formation of a variety of reaction products within the cell and physically consumes available carbon sites, thionyl chloride and lithium until one of these components is depleted. The life span of the cell is to a large degree dictated by the amount of lithium and thionyl chloride initially present in the cell and the rate at which the thionyl chloride and lithium are depleted by electrochemical action within the cell.

A further, and undesirable, reduction of the thionyl chloride also takes place at those metallic portions and surfaces of the cell at the same electrical potential as the lithium anode. This latter reduction of the thionyl chloride, which may take place during storage of the cell prior to normal discharge of the cell, is a parasitic self-discharge reaction and can lead to an undesirable capacity loss and a premature termination of the rated life span of the cell.

To prevent parasitic discharge, it is known to keep the electrolyte separate from the other cell components during storage and until activation. Cells having this feature are known as reserve cells. One arrangement to do this includes a reservoir located above the electrode stack and sealed by a rupturable disk. In another arrangement, a glass ampule containing a ready-to-use electrolyte is centrally located within the cell.

SUMMARY OF THE INVENTION

In one aspect of the invention, an electrochemical reserve cell is assembled by arranging within a cylindrical housing a concentric arrangement of a container, a lithium sheet, a porous separator, and a porous carbon element. The container holds a quantity of electrolyte solute which may be either a salt or dissolved in a solvent. A quantity of liquid cathode solvent is inserted in the housing but outside the centrally located container. Electrical contact is made between the lithium sheet and a cap terminal and the housing is sealed completing the assembly.

To activate the cell, the container is broken, allowing its contents to mix with the solvent.

BRIEF DESCRIPTION OF THE DRAWING

The single FIGURE of the drawing is an elevational view, partly in cross-section, of a reserve-type electrochemical cell of a design for eliminating parasitic self-discharge of the cell during storage.

DETAILED DESCRIPTION OF THE INVENTION

Referring now to the single FIGURE, there is shown a reserve type electrochemical cell 1 fabricated in accordance with the present invention.

In the embodiment shown, the cell 1 has an elongated cylindrical metal housing 2 which may be stainless steel. Disposed within the housing 2 is a concentric cylindrical arrangement of a cathode current collector structure 3, a thin porous separator 4 and an anode structure 5. The arrangement of these three components 3, 4, 5 is collectively referred to as a battery stack.

The aforementioned cathode current collector structure 3 in accordance with the invention is preferably a porous carbon element in the form of an elongated cylindrical sheet.

The porous carbon element is first produced by compressing an aggregation of discreet semi-tight porous carbon conglomerates on both sides of a metal support screen which may be nickel or stainless steel. The conglomerates of the element as described hereinabove generally contain a combination of carbon black, graphite, and a binder such as polytetrafluorethylene. By virtue of the porous nature of the above ingredients when compressed together, a network of electrolyte-conducting channels are established throughout the carbon element whereby the carbon element can be permeated by electrolytic solution. Techniques for producing the conglomerates employed by the carbon element are described in detail in U.S. Pat. No. 4,161,063 to which reference may be made for specific details.

The cathode current collector structure 3 physically abuts the interior wall of housing 2 and forms an electrical connection therewith establishing the housing 2 as the positive terminal of the cell.

The aforementioned porous separator 4 is disposed intermediate to the cathode current collector structure 3 and the anode structure 5 and is used to electrically isolate the cathode current collector structure 3 from the anode structure 5. The separator 4 typically takes the form of a cylindrical sheet of a standard, electrically non-conductive material such as fiberglass.

The anode structure 5 as utilized within the cell is preferably a solid elongated cylindrical sheet of an oxidizable active alkali metal such as lithium.

A thin, flexible, electrically conductive metal jumper element 6 is physically and electrically connected between the anode structure 5 and a metal feedthrough member 7. The feedthrough member 7 passes through a standard insulator glass or ceramic to metal seal 8 provided within a hermetically sealed cap or cover 21 of the cell 1. The free end of the feedthrough member serves as a negative terminal of the cell.

The aforementioned jumper element 6 may be of nickel in the form of a wire or flat ribbon and secured to the metal anode structure 5 in any suitable way, such being embedded within the metal sheet. The other end of the jumper element is secured (e.g., welded) to the feedthrough member 7.

The jumper element 6, by virtue of its non-rigid, flexible nature and small thickness, for example, 0.005–0.015 inch, serves to absorb any shock or vibration to which the cell 1 might be exposed, thereby to prevent a break in the physical and electrical connection between the anode structure 5 and the feedthrough member 7, and also to minimize the possibility of physical damage to the glass or ceramic-to-metal seal 8 due to such factors as shock and vibration.

Container 9 is a barrier which divides the interior of housing 2 into a first volume and a second volume. The first volume is the interior of the container 9 and the second volume is the space within housing 2 but outside container 9.

As a feature of the invention, the container 9 may contain a quantity of concentrated electrolyte solution 10. A suitable and preferred electrolytic solution is a cathode electrolyte solution including a reducible liquid cathode solvent, such as thionyl chloride, and an electrolyte solute, such as lithium tetrachloraluminate, dissolved in the thionyl chloride. By "concentrated" what is meant is that the concentration of the electrolyte solution within container 9 is higher than the diluted electrolyte solution normally used in similar cells (e.g., 2.0 mol versus 0.9 mol of lithium tetrachloraluminate solution). Alternatively, the container may contain one or more undissolved electrolyte solutes, such as lithium tetrachloraluminate salt or a mixture of lithium tetrachloraluminate and aluminum trichloride ($AlCl_3$) salts or a mixture of lithium chloride (LiCl) and aluminum trichloride ($AlCl_3$) salts. Also, liquid cathodes other than thionyl chloride may be used.

The container 9 is made of an electrically non-conductive material which may be pierced or broken to release its contents and activate the cell 1. As seen in the drawing, the container 9 is preferably a glass ampule centrally located within the housing 2. The container 9 is supported by a shim 11 which spaces the container 9 from the feedthrough member 7. Resilient pads 12, 13, on both sides of the shim 11, urge the container toward the end 14 of the housing 2 and prevents movement of the container 9 within the housing 2. Resilient support 20 provides a slight space between container 9 and bottom 14.

The container 9 may be broken by pressure upon the housing end 14. A porous shroud 15 surrounds the container for allowing the flow of electrolyte while retaining glass fragments.

As an additional feature of the invention during reserve mode, that is before activation, the intracellular space outside the container 9 contains a quantity of liquid cathode electrolyte solvent 16, preferably thionyl chloride. At least some of the solvent permeates the porous carbon element 3 and the porous separator 4.

Thionyl chloride, by itself, is non-conductive and does not seem to react with either the carbon electrode 3 or the lithium anode 5 at storage temperature. Cells filled with thionyl chloride showed no capacity loss or sign of passivation after three months storage at 55° C.

The cell 1 may be assembled in the following manner. The metal housing 2 may be a stainless steel tube closed at one end 14 and open at the other. A porous insulating disc 19 may be inserted to cover the closed end 14 followed by spacer 20. The battery stack (elements 3, 4, 5) is then inserted into the housing 2 and then the sealed container 9 containing the concentrated electrolyte or undissolved solute is placed in the center of the concentric battery stack.

The cap 21 (which is also known as a header in the art) is preassembled with the feedthrough member 7 supported by an electrically non-conductive glass or ceramic seal 8. The jumper member is attached i.e., spot welded to the inner end of the feedthrough member 7. The container supports 12, 13 and shim 11 are placed over the exposed end of the container 9. Then, the cap 21 is pushed into the open end of the housing 2 and sealed by welding to the edge 17 of housing 2.

The aforementioned feedthrough member 7 may be cylindrical and hollow (tubular) to permit the introduction of pure solvent 16 e.g., thionyl chloride into the housing. Following the filling operation, the feedthrough member 7 is sealed at its outside opening 18, as by welding. At that point, the cell 1 has an open circuit voltage, between housing 2 and feedthrough member 7, however, it is not capable of providing any discharge due to the high resistivity of pure thionyl chloride.

Alternatively, solvent 16 may be introduced into the housing 2 before cap 21 is sealed to the housing.

The amount of thionyl chloride prefilled into the stack depends largely on the final electrolyte concentration desired. If the container 9 is filled with concentrated electrolyte solution 10, that solution is later diluted by the amount of thionyl chloride 16 absorbed in the stack. For a 1:1 ratio between the volume of concentrated electrolyte 10 and of solvent 16, starting with 1.8 mol tetrachloraluminate in the container, the final concentration of electrolyte in the cell would be 0.9 mol. If other molarities were desired, one has the option to change either the concentration in the container or the volume ratio of thionyl chloride 16 versus electrolyte 10 within the container 9.

To activate the cell, the container is opened allowing its contents 10 of concentrated electrolyte solution or electrolyte solute to mix with the solvent 16 already present in the cell 1 to form a diluted electrolyte solution.

The components of the diluted electrolyte are stored both internal and external to the container 9. The solvent outside the container 9 has about the same vapor pressure as a concentrated electrolyte solution within the container 9. This reduces the differential pressure on the walls of container 9 which would be present if the container was filled with electrolyte solution and the cell was not prefilled of solvent. The balance of pressure allows the use of thin glass walls for the container 9, increasing the available volume. Furthermore, for the same volume of electrolyte solution, a smaller volume container may be used to increase available intracellular volume.

After activation of the cell 1 as described hereinabove, during normal discharge of the cell 1, the reducible cathode solvent, namely, the thionyl chloride, is catalytically reduced principally at the surface of the cathode current collector structure 3. The catalytic reduction results in the formation of a variety of reaction products within the cell and, as determined by the rate of this catalytic reduction, a gradual depletion of the metal i.e., lithium, of the anode structure 5 and the reducible cathode solvent. The complete depletion or consumption of either one or both of these consumable components determines the end of the useful life of the cell. The increase of available volume allows more of one or both of the consumables to be used in a given size cell thereby increasing the weight efficiency of the cell.

The method described above is the preferred embodiment of the invention, the scope of which is defined by the following claims.

I claim:

1. A method for fabricating an electrochemical cell comprising the steps of:
    providing a cylindrical housing opened at one end and closed at the other end;
    arranging within said housing a concentric arrangement of a porous carbon element, a porous separator and a lithium sheet, and a conductive jumper element connected to said sheet with said porous carbon element abuting said housing;
    inserting a container containing a quantity of concentrated electrolyte solution composed of a solute and a first solvent into the center of said concentric arrangement;
    providing a cap with a hollow feedthrough member supported by a non-conductive seal;
    attaching said jumper element to said feedthrough member;
    sealing said cap to the free end of said housing;
    introducing a quantity of a second solvent to the interior of said housing through said feedthrough member; and
    sealing said feedthrough member.

2. The method of claim 1 wherein said solute is lithium tetrachloraluminate and said first and second solvent is thionyl chloride.

3. A method for fabricating an electrochemical all comprising the steps of:
    providing a cylindrical housing opened at one end and closed at the other end;
    arranging within said housing a concentric arrangement of a porous carbon element, a porous separator and a lithium sheet, and a conductive jumper element connected to said sheet with said porous carbon element abuting said housing;
    inserting a container containing a quantity of concentrated electrolyte solution comprised of a solute and a first solvent into the center of said concentric arrangement;
    permeating said porous carbon element and said porous separator with a quantity of a second solvent;
    providing a cap with a feedthrough member supported by a non-conductive seal;
    attaching said jumper element to said feedthrough member; and
    sealing said cap to the free end of said housing.

4. The method of claim 3 wherein said solute is lithium tetrachloraluminate and said first and second solvent is thionyl chloride.

5. A method for fabricating an electrochemical cell comprising the steps of:
    providing a cylindrical housing opened at one end and closed at the other end;
    arranging within said housing a concentric arrangement of a porous carbon element, a porous separator and a lithium sheet, and a conductive jumper element connected to said sheet with said porous carbon element abuting said housing;
    inserting a container containing a quantity of concentrated electrolyte solution composed of a solute and a first solvent into the center of said concentric arrangement;
    providing a cap with a hollow feedthrough member supported by a non-conductive seal;
    attaching said jumper element to said feedthrough member;
    sealing said cap to the free end of said housing;
    introducing a quantity of a second solvent to the interior of said housing through said feedthrough member; and
    sealing said feedthrough member.

6. The method of claim 5 wherein said solute is lithium tetrachloraluminate and said solvent is thionyl chloride.

7. The method of claim 5 wherein said solute is a mixture of lithium tetrachloraluminate and aluminum trichloride and said solvent is thionyl chloride.

8. The method of claim 5 wherein said solute is a mixture of lithium chloride and aluminum trichloride.

* * * * *

UNITED STATES PATENT OFFICE
CERTIFICATE OF CORRECTION

Patent No. 4,517,736            Dated May 21, 1985

Inventor(s) Franz Goebel

It is certified that error appears in the above-identified patent and that said Letters Patent are hereby corrected as shown below:

At col. 1, line 38,
    col. 3, line 34,
    col. 3, line 39,
    col. 3, line 40 (2 occurrences),
    col. 4, line 42, col. 5, line 40,
    col. 6, line 16,
    col. 6, line 41, and
    col. 6, line 44, change "tetrachloraluminate" to --tetrachloroaluminate--.

Signed and Sealed this

Twenty-fourth Day of September 1985

[SEAL]

Attest:

DONALD J. QUIGG

Attesting Officer

Commissioner of Patents and Trademarks—Designate